US008081257B2

(12) United States Patent
Yang

(10) Patent No.: US 8,081,257 B2

(45) Date of Patent: Dec. 20, 2011

(54) METHOD AND SYSTEM FOR PROCESSING IMAGE DATA IN LCD BY INTEGRATING DE-INTERLACE AND OVERDRIVE OPERATIONS

(75) Inventor: Ho-Hsing Yang, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 958 days.

(21) Appl. No.: 12/073,487

(22) Filed: Mar. 6, 2008

(65) Prior Publication Data

US 2008/0218629 A1 Sep. 11, 2008

(30) Foreign Application Priority Data

Mar. 6, 2007 (TW) ............................... 96107607 A

(51) Int. Cl.
*H04N 7/01* (2006.01)

(52) U.S. Cl. ........ 348/448; 348/449; 348/450; 348/451; 348/452; 348/50; 348/51

(58) Field of Classification Search ................... 348/448
See application file for complete search history.

(56) References Cited

U.S. PATENT DOCUMENTS 6,392,712 B1 * 5/2002 Gryskiewicz et al. ........ 348/584
6,456,329 B1 * 9/2002 Tinker et al. .................. 348/448
2004/0004672 A1 * 1/2004 Carlsgaard et al. ........... 348/448
2004/0100577 A1 * 5/2004 Linzer et al. .................. 348/383
2005/0094034 A1 * 5/2005 Bhatia et al. .................. 348/581
2006/0028492 A1 * 2/2006 Yamaguchi et al. .......... 345/690
2006/0072042 A1 * 4/2006 Chang et al. .................. 348/714
2006/0227249 A1 * 10/2006 Chen et al. .................... 348/631
2006/0274162 A1 * 12/2006 Fujishiro .................... 348/229.1
2007/0018934 A1 * 1/2007 Kim et al. ....................... 345/98
2007/0103590 A1 * 5/2007 Azar et al. .................... 348/459
2007/0146479 A1 * 6/2007 Huang et al. ..................... 348/51
2008/0266305 A1 * 10/2008 Cheng et al. .................. 345/545

* cited by examiner

*Primary Examiner* — Brian Pendleton
*Assistant Examiner* — Fernando Alcon
(74) *Attorney, Agent, or Firm* — Bacon & Thomas, PLLC

(57) ABSTRACT

A system for integrating de-interlace and overdrive operations includes a de-interlace device, a first frame scaling controller, a second frame scaling controller and an overdrive device. The de-interlace device performs a de-interlace operation on plural fields to thereby obtain plural frames. The first frame scaling controller receives a first frame among the plural frames and performs a vertical and horizontal scaling operation on the first frame to thereby produce a first display frame. The second frame scaling controller receives a second frame among the plural frames and performs a vertical and horizontal scaling operation on the second frame to thereby produce a second display frame. The overdrive device produces a driving voltage based on a difference between a pixel of the second display frame and a pixel of the first display frame corresponding to the pixel of the second display frame.

11 Claims, 5 Drawing Sheets

METHOD AND SYSTEM FOR PROCESSING IMAGE DATA IN LCD BY INTEGRATING DE-INTERLACE AND OVERDRIVE OPERATIONS

BACKGROUND OF THE INVENTION

1. Field of the Invention

The present invention relates to the technical field of liquid crystal displays (LCDs) and, more particularly, to a method and system for processing image data in LCD by integrating de-interlace and overdrive operations.

2. Description of Related Art

Upon the rapid advance of electronic technologies, CRTs are increasingly replaced by LCDs. FIG. 1 is a schematic diagram of a partial circuit of an LCD, which includes a de-interlace device 110, a frame scaling controller 120, an overdrive device 130 and dynamic random access memories (DRAMs) 140, 150. As shown in FIG. 1, for the limited bandwidth, the video datastream uses alternate odd and even fields in transmission. The de-interlace device 110 directly merges two adjacent odd and even fields into a progressive scan frame. The frame scaling controller 120 performs a vertical and horizontal scaling on a frame to thereby produce a display frame which meets with the resolution of an LCD screen.

FIG. 2 is schematic graph of an operation of the overdrive device 130. The overdrive device 130 uses the difference between gray levels of corresponding pixels in two successive display frames so as to adjust the target gray levels to thereby improve the slow response. As shown in FIG. 2, $V_N(I, J)$ indicates a driving voltage of a pixel (I, J) of a first display frame, and $V_{N+1}(I, J)$ indicates a driving voltage of a pixel (I, J) of a second display frame. When the system does not use the overdrive device, the driving voltage $V_{N+1}(I, J)$ for the pixel (I, J) of the second display frame is shown in curve A. When the overdrive device 130 is adopted, the driving voltage $V_{N+1}(I, J)$ for the pixel (I, J) of the second display frame is shown in curve B, thereby reducing the response time of the liquid crystal display screen.

The first and second display frames are stored in the memory 150 for the overdrive device 130 to compute the gray levels of corresponding pixels in the two successive display frames. However, the required memory size is increased more and more with the increasingly high resolution of the LCD screen. Accordingly, the memory bandwidth for the overdrive device 130 to read the two successive frames is required more and more.

To overcome the aforementioned problem, the prior art reduces the number of bits for representing a gray level, such as from 8-bit to 5-bit, for storing in the memory to thereby reduce the required DRAM 150, but the entire system still requires two DRAMs 140, 150. In such case, it is hard to integrate the de-interlace device 110, the frame scaling controller 120 and the overdrive device 130 into one chip.

Therefore, it is desirable to provide an improved LCD circuit to mitigate and/or obviate the aforementioned problems.

SUMMARY OF THE INVENTION

An object of the present invention is to provide a method and system for processing an image data in an LCD by integrating de-interlace and overdrive operations, which reduces the required memory amount and the system cost.

Another object of the present invention is to provide a method and system for processing an image data in an LCD by integrating de-interlace and overdrive operations, which can integrate the de-interlace device, the frame scaling controller and the overdrive device into a single chip to thereby increase the system integration and achieve the purpose of saving the cost.

In accordance with one aspect of the present invention, there is provided a system for integrating de-interlace and overdrive operations. The system includes a de-interlace device, a first frame scaling controller, a second frame scaling controller and an overdrive device. The de-interlace device receives a video datastream consisting of plural fields and performs a de-interlace operation on the fields to thereby obtain plural frames corresponding to the plural fields. The first frame scaling controller is connected to the de-interlace device in order to receive a first frame among the plural frames and perform a vertical and horizontal scaling operation on the first frame to thereby produce a first display frame. The second frame scaling controller is connected to the de-interlace device in order to receive a second frame among the plural frames and perform a vertical and horizontal scaling operation on the second frame to thereby produce a second display frame. The overdrive device is connected to the first and the second frame scaling controllers in order to produce a driving voltage based on a difference between a pixel of the second display frame and a pixel of the first display frame corresponding to the pixel of the second display frame.

In accordance with another aspect of the present invention, there is provided a method for integrating de-interlace and overdrive operations in a liquid crystal display (LCD). The method includes: a receiving step, which receives a video datastream consisting of plural fields; a de-interlace step, which performs a de-interlace operation on the plural fields to thereby obtain plural frames corresponding to the plural fields; a first frame scaling step, which receives a first frame among the plural frames and performs a vertical and horizontal scaling operation on the first frame to thereby produce a first display frame; a second frame scaling step, which receives a second frame among the plural frames and performs a vertical and horizontal scaling operation on the second frame to thereby produce a second display frame; an overdrive step, which is based on a difference between a pixel of the second display frame and a pixel of the first display frame corresponding to the pixel of the second display frame to accordingly produce a driving voltage.

In accordance with a further aspect of the invention, there is provided a memory storing system for de-interlace operation. The memory storing system comprises: a de-interlace device, which receives a video datastream consisting of plural fields and performs a de-interlace operation on the plural fields to thereby obtain plural frames corresponding to the plural fields; and a storage device connected to the de-interlace device in order to temporarily store the plural fields received by and the plural frames produced by the de-interlace device. The de-interlace device receives a first frame and a first field of a second frame and stores the first frame and the first field of the second frame in the storage device. Next, the de-interlace device receives a field of a third frame and reads out the first frame and the first field of the second frame from the storage device for performing de-interlace on the first field of the second frame and generates a second field corresponding to the first field of the second frame thereby constituting the second frame from the first and second fields of the second frame. Then, the de-interlace device stores the second field of the second frame in the storage device for performing de-interlace on the field of third frame Other objects, advantages, and novel features of the invention will become more apparent from the following detailed description when taken in conjunction with the accompanying drawings.

DETAILED DESCRIPTION OF THE PREFERRED EMBODIMENT

Figure 1:
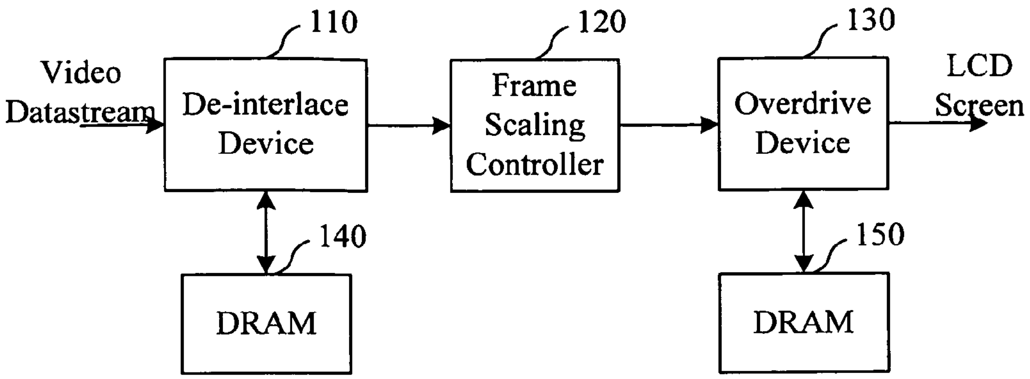
FIG. 1 (Prior Art)
FIG. 1 is a schematic diagram of a partial circuit of a typical LCD.
Figure 2:
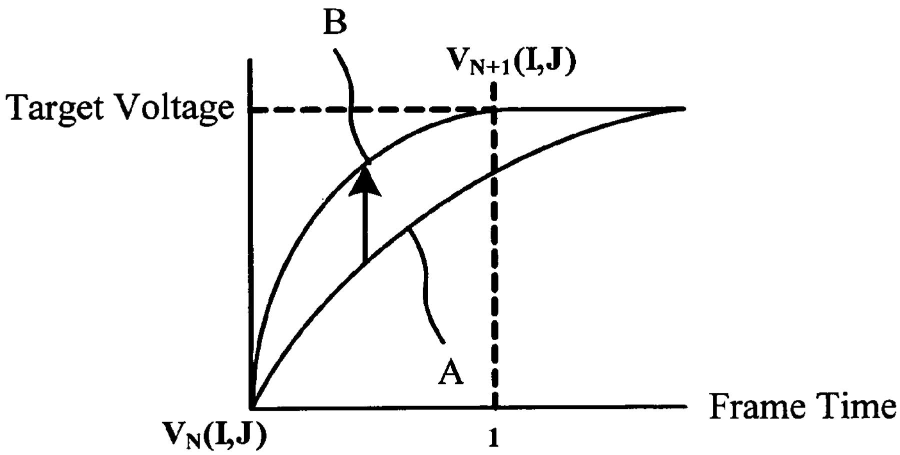
FIG. 2 (Prior Art)
FIG. 2 shows a schematic graph of an operation of a typical overdrive device.
Figure 3:
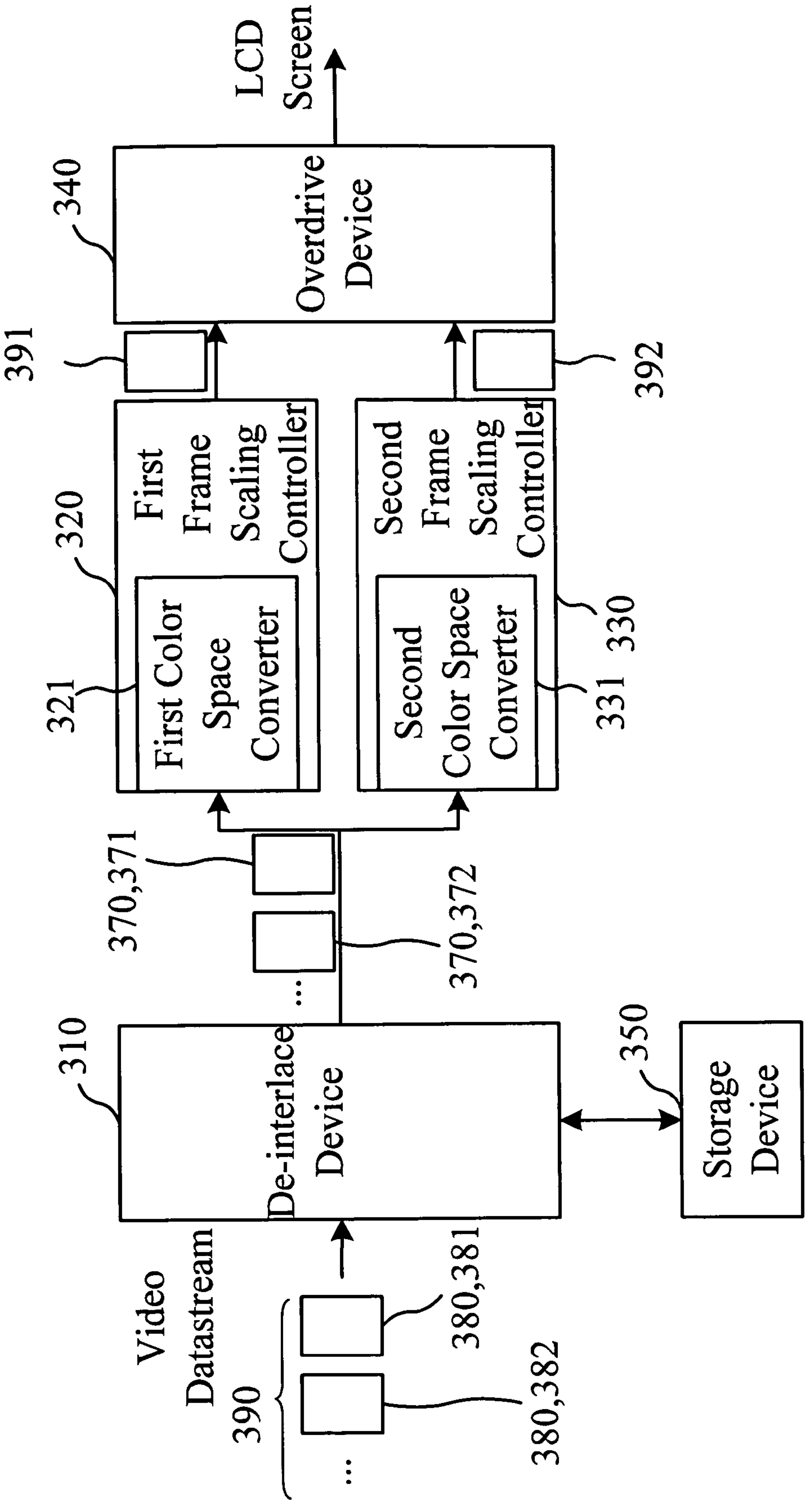
FIG. 3 is a block diagram of the system for integrating de-interlace and overdrive operations in accordance with an embodiment of the invention.

FIG. 3 is a block diagram of the system for integrating de-interlace and overdrive operations in accordance with an embodiment of the invention. As shown in FIG. 3, the system includes a de-interlace device 310, a first frame scaling controller 320, a second frame scaling controller 330, an overdrive device 340 and a storage device 350.

The de-interlace device 310 receives a video datastream 390 consisting of plural fields 380 and performs a de-interlace operation on the plural fields 380 to thereby obtain plural frames 370 corresponding to the plural fields 380.

The de-interlace device 310 can directly merge the odd and even fields into the progressive scan frames 370. In addition, the de-interlace device 310 can use a threshold to determine if a field 380 is a motion picture or not. When the moving amount exceeds the threshold, it is determined that the field 380 is the motion picture. Accordingly, an interpolation is applied to a single field to thereby form a frame 370, and a sawtooth effect is avoided. When the moving amount is smaller than the threshold, it is determined that the field 380 is the still picture. Accordingly, two successive fields 380 are directly merged into the frame 370, and a flicker effect is avoided.

Further, the de-interlace device 310 can determine if a field 380 is of a motion picture in frequency domain, thereby enhancing the accuracy on the determination.

Since the video datastream has a resolution of 640X480 and a typical LCD screen has a resolution of 1024X768 or 1280X1024, enlarging or reducing an output frame 370 of the de-interlace device 310 to a specification limit of the resolution of the LCD is required before display.

The first frame scaling controller 320 is connected to the de-interlace device 310 in order to receive the first frame 371 of the plural frames 370 and perform a vertical and horizontal scaling operation on the first frame 371 to thereby produce a first display frame 391.

The de-interlace device 310 performs the de-interlace operation on the pixels in a YUV or YcbCr format, but the overdrive device 340 performs an overdrive operation on the pixels in an RGB format. Accordingly, the first frame scaling controller 320 includes a first color space converter 321 to convert the pixels of the first frame 371 from the YUV or YCbCr format to the RGB format.

The second frame scaling controller 330 is connected to the de-interlace device 310 in order to receive the second frame 372 of the plural frames and perform a vertical and horizontal scaling operation on the second frame 372 to thereby produce a second display frame 392.

In addition, the second frame scaling controller 330 includes a second color space converter 331 to convert the pixels of the second frame 372 from the YUV format to the RGB format.

The overdrive device 340 is connected to the first and the second frame scaling controllers 320 and 330 in order to produce a driving voltage based on a difference between a pixel of the second display frame 392 and a pixel of the first display frame 391 corresponding to the pixel of the second display frame 392.

The storage device 350 is connected to the de-interlace device 310 in order to temporarily store the plural fields 380 received by and the plural frames 370 produced by the de-interlace device 310. The storage device 350 is preferably a memory, such as a dynamic random access memory (DRAM). In this embodiment, the DRAM can be a synchronous DRAM and/or double data rate DRAM. The double data rate DRAM can be DDR-I, DDR-II, DDR-333 or DDR-400, for example.

Figure 4:
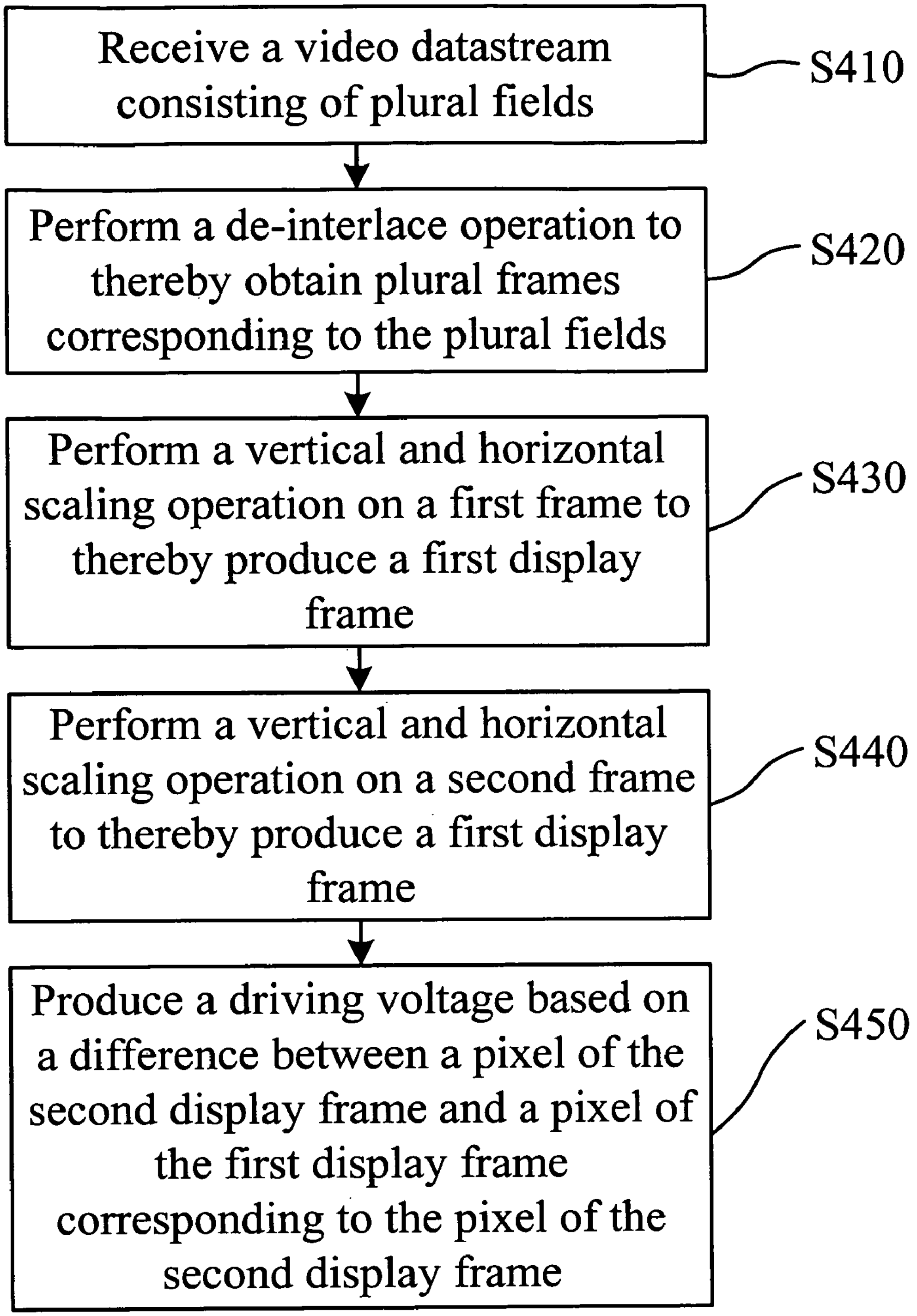
FIG. 4 is a flowchart of the method for integrating de-interlace and overdrive operations in an LCD in accordance with an embodiment of the invention.

FIG. 4 is a flowchart of the method for integrating de-interlace and overdrive operations in an LCD in accordance with an embodiment of the invention. As shown in FIG. 4, step S410 receives a video datastream 390 consisting of plural fields 380.

Step S420 performs a de-interlace operation on the plural fields 380 to thereby obtain plural frames 370 corresponding to the plural fields 380. In step S420, two adjacent odd and even fields 381 and 382 can be directly merged into a progressive scan frame 370. In addition, a threshold can be used to determine if a field 380 is the motion picture. When the moving amount exceeds the threshold, it is determined that the field 380 is the motion picture. Accordingly, an interpolation is applied to a single field to thereby form a frame 370, and a sawtooth effect is avoided. When the moving amount is smaller than the threshold, it is determined that the field 380 is the still picture. Accordingly, two successive fields 380 are directly merged into the frame 370, and a flicker effect is avoided.

Further, in step S420, whether a field 380 is the motion picture can be determined in frequency domain, thereby enhancing the accuracy on the determination.

Since the video datastream has a resolution of 640X480 and a typical LCD screen has a resolution of 1024X768 or 1280X1024, enlarging or reducing a frame produced in step S420 to fit a specification limit of the resolution from the LCD before display.

Step S430 receives the first frame 371 of the plural frames 370 produced in step S420 and performs a vertical and horizontal scaling operation on the first frame 371 to thereby produce a first display frame 391.

Since the de-interlace operation is applied to the pixels with a YUV or YcbCr format, but the pixels are displayed in an RGB format, step S430 further includes a first color space converting step, which converts the pixels of the first frame 371 from the YUV or YCbCr format to the RGB format.

Step S440 receives the second frame 372 of the plural frames produced in step S420 and performs a vertical and horizontal scaling operation on the second frame 372 to thereby produce a second display frame 392. Similarly, step S440 further includes a second color space converting step, which converts the pixels of the second frame 372 from the YUV or YCbCr to the RGB format.

Step S450 produces a driving voltage based on a difference between a pixel of the second display frame 392 and a pixel of the first display frame 391 corresponding to the pixel of the second display frame 392.

Figure 5:
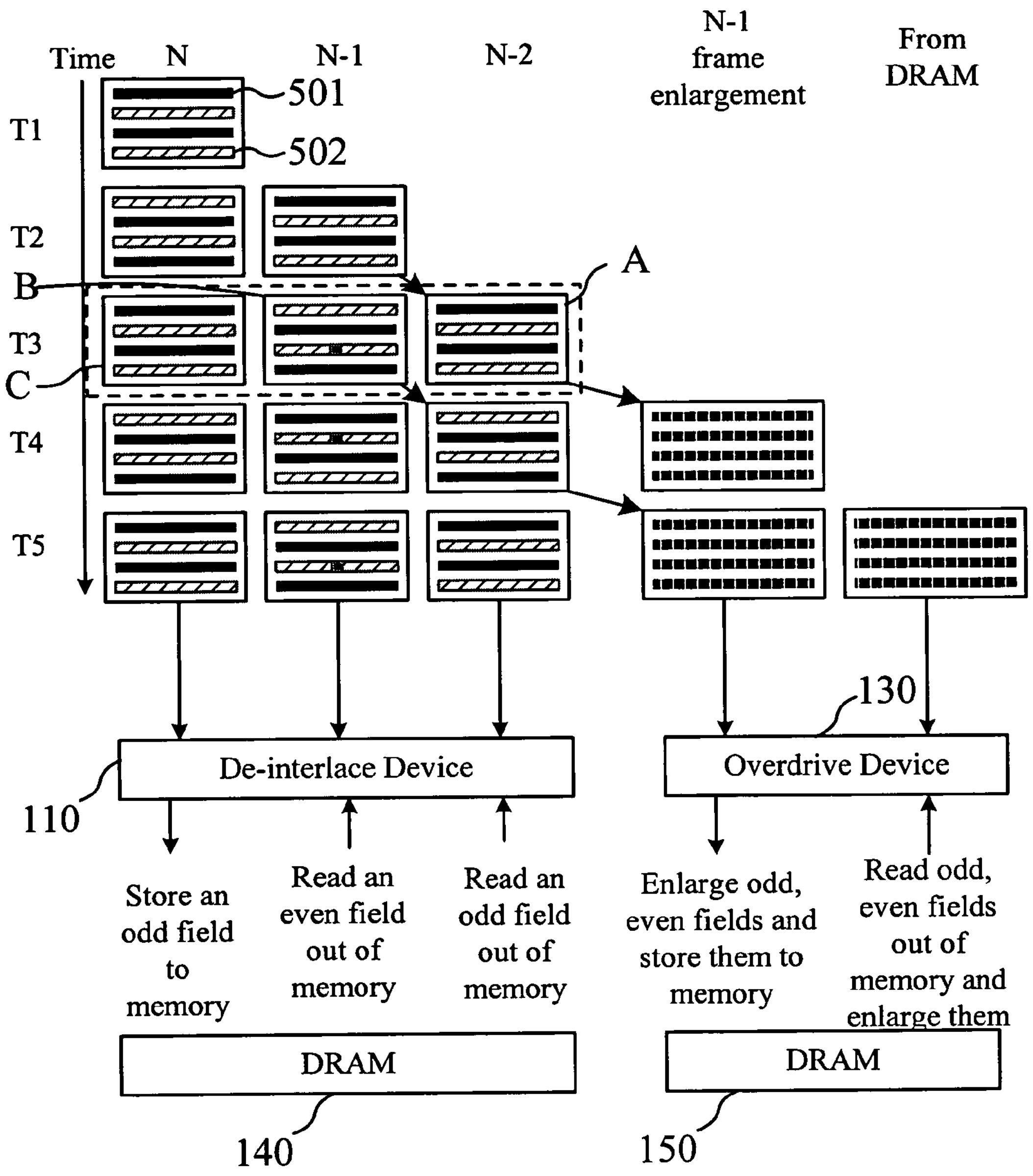
FIG. 5 (Prior Art)
FIG. 5 is a schematic diagram showing the operation of typical de-interlace and overdrive devices.

FIG. 5 is a schematic diagram showing the operation of typical de-interlace and overdrive devices. In FIG. 5, the black line 501 denotes the existing pixels, and the slash line 502 denotes the non-existing pixels, which are present after the de-interlace device 110 performs an interpolation.

As shown in FIG. 5, at the time T3, the de-interlace operation is applied to Field B. As cited, an interpolation is sometimes applied to a single field (in this case, Field B) to form a frame, and sometimes two successive fields (in this case, Field A and Field C) are merged into the frame. When Field B is interpolated into the frame, the de-interlace device 110 requires reading the data of Field B out of the DRAM 140. When Field A and Field C are merged into the frame, the de-interlace device 110 requires receiving Field C and writing the received Field C in the DRAM 140, and concurrently requires reading Field A out of the DRAM 140. Accordingly, the DRAM 140 at least requires a size equal to three fields. In addition, if the enlarged size of the frame is not considered, for performing the overdrive operation, the overdrive device 130 requires comparing the pixel values of the two successive frames, and accordingly the DRAM 150 at least requires a size equal to four (=2+2) fields.

Figure 6:
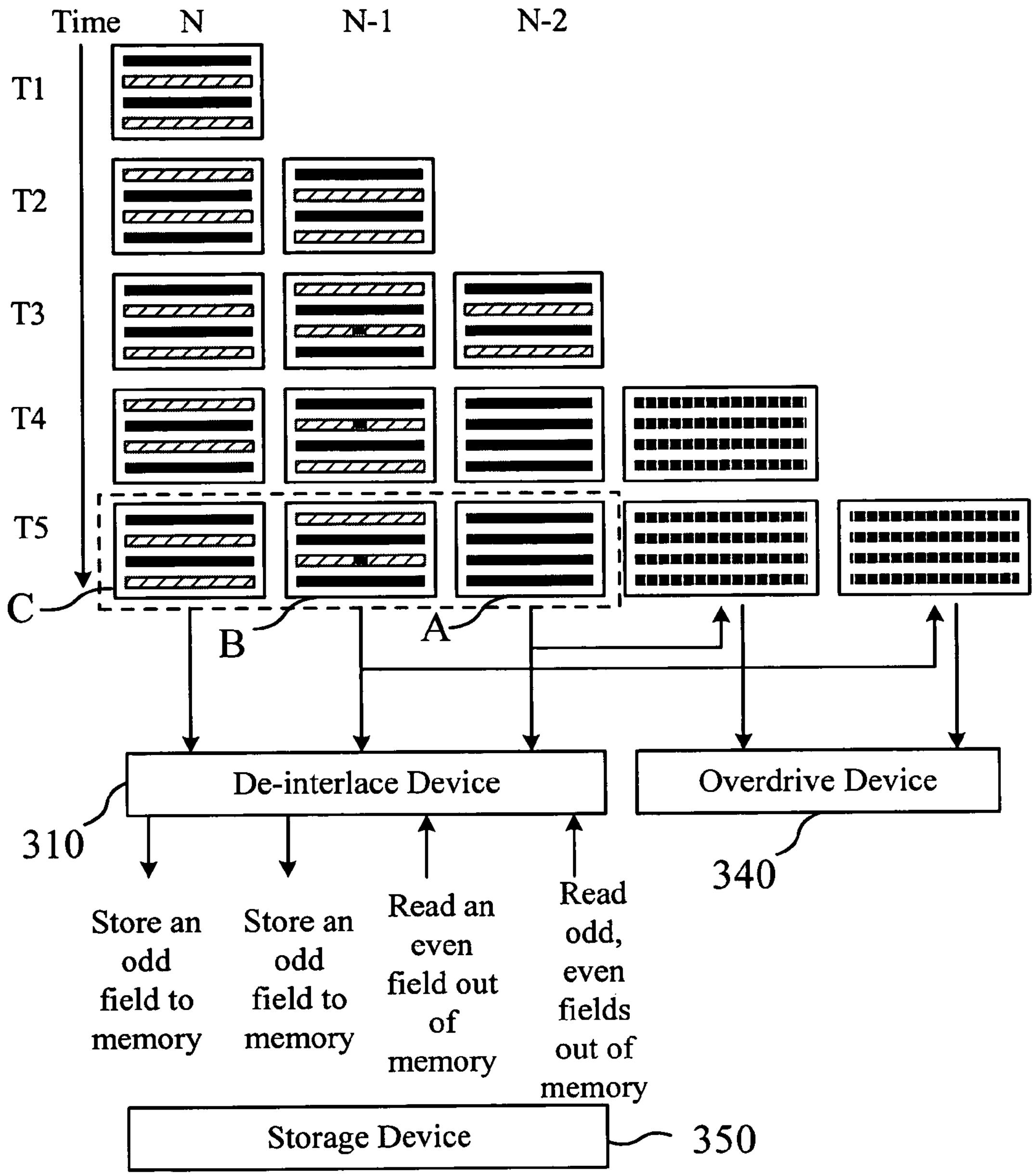
FIG. 6 is a schematic diagram showing the operation of de-interlace and overdrive devices in accordance with an embodiment of the invention.

FIG. 6 is a schematic diagram showing the operation of de-interlace and overdrive devices in accordance with an embodiment of the invention. As shown in FIG. 6, at the time T5, the de-interlace operation is applied to Field B. The de-interlace device 310 requires receiving Field C and writing the received Field C in the storage device 350, and concurrently requires reading Field B and Frame A out of the storage device 350 for performing a de-interlace operation. Accordingly, the DRAM 140 at least requires a size equal to three fields. Since Field B is an even field, an odd field corresponding to Field B is produced after the de-interlace operation is performed and written by the de-interlace device 310 in the storage device 350 for use when a de-interlace operation is applied to Field C.

By contrast, the prior art uses the frame scaling controller 120 to perform a scaling operation on the odd field produced by a de-interlace operation, and the odd field produced is not stored back to the DRAM 140. However, the invention stores the odd field produced by a de-interlace operation back to the storage device 350 to thereby combine it with Field B previously stored in the storage device 350 into a frame for use when a de-interlace operation is applied to a next field. Therefore, the size of the storage device 350 in the invention has two fields, i.e., the even field of Frame A produced by the de-interlace operation previously performed and the odd field corresponding to Field B produced by the de-interlace operation currently performed, more than that of the DRAM 140 in the prior art.

In view of the foregoing, it is known that the amount of memory used in the invention is five frames. However, the amount of memory used in the prior art at least requires seven frames, i.e., three fields required for the DRAM 140 and four fields required for the DRAM 150. In addition, when an image enlargement is considered to meet the resolution of the LCD screen, the amount of memory used in the prior art exceeds seven frames. Further, the amount of memory used in the prior art is increased with the increasingly higher resolution of the LCD screen, which does not occur in the invention. Furthermore, the invention only configures one memory, which can save the memory control interface and easily integrate the memory into a single IC as compared to the prior art. Thus, the system integration is increased, and the purpose of saving the cost is achieved.

Although the present invention has been explained in relation to its preferred embodiment, it is to be understood that many other possible modifications and variations can be made without departing from the spirit and scope of the invention as hereinafter claimed.

What is claimed is:

1. A system for integrating de-interlace and overdrive operations, comprising:

a de-interlace device, which receives a video datastream consisting of plural fields and performs a de-interlace operation on the plural fields to thereby obtain plural frames corresponding to the plural fields;

a first frame scaling controller, which is connected to the de-interlace device in order to receive a first frame among the plural frames and perform a vertical and horizontal scaling operation on the first frame to thereby produce a first display frame;

a second frame scaling controller, which is connected to the de-interlace device in order to receive a second frame among the plural frames and perform a vertical and horizontal scaling operation on the second frame to thereby produce a second display frame; and an overdrive device, which is connected to the first frame scaling controller and the second frame scaling controller in order to produce a driving voltage based on a difference between of a pixel of the second display frame and of a pixel of the first display frame corresponding to the pixel of the second display frame.

2. The system as claimed in claim 1, further comprising:

a storage device connected to the de-interlace device in order to temporarily store the plural fields received by and the plural frames produced by the de-interlace device.

3. The system as claimed in claim 1, wherein if the de-interlace device determines a field is a motion picture, an interpolation is applied to the field in order to form a frame; and otherwise, two successive fields are directly merged to form the frame.

4. The system as claimed in claim 1, wherein the first frame scaling controller further comprises a first color space converter to convert pixels of the first frame from a YUV or YCbCr format to an RGB format.

5. The system as claimed in claim 1, wherein the second frame scaling controller further comprises a second color space converter to convert pixels of the second frame from a YUV or YCbCr format to an RGB format.

6. The system as claimed in claim 2, wherein the storage device is a memory.

7. The system as claimed in claim 6, wherein the memory is a dynamic random access memory (DRAM).

8. The system as claimed in claim 7, wherein the DRAM is a synchronous DRAM.

9. The system as claimed in claim 7, wherein the DRAM is a double data rate DRAM.

10. The system as claimed in claim 9, wherein the double data rate DRAM is one selected from DDR-I, DDR-II, DDR-333 and DDR-400.

11. The system as claimed in claim 3, wherein the de-interlace device determines if a field is of a motion picture in frequency domain.

* * * * *